(12) United States Patent
Hanai et al.

(10) Patent No.: US 6,547,443 B2
(45) Date of Patent: Apr. 15, 2003

(54) TAPERED ROLLER BEARING

(75) Inventors: Kimihiro Hanai, Mie (JP); Takashi Tsujimoto, Mie (JP); Tsukasa Yamakawa, Mie (JP); Yasuhiro Shimizu, Mie (JP); Shiro Ishikawa, Mie (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/977,216

(22) Filed: Oct. 16, 2001

(65) Prior Publication Data
US 2002/0044707 A1 Apr. 18, 2002

(30) Foreign Application Priority Data

Oct. 17, 2000 (JP) ........................................ 2000-316566
Jan. 23, 2001 (JP) ........................................ 2001-014932

(51) Int. Cl.$^7$ ............................. F16C 33/36; F16C 33/58
(52) U.S. Cl. ........................................ 384/571; 384/450
(58) Field of Search ................................ 384/450, 565, 384/569, 571, 568

(56) References Cited

U.S. PATENT DOCUMENTS

| | | | |
|---|---|---|---|
| 4,828,404 A | * | 5/1989 | Takata ........................ 384/450 |
| 5,007,747 A | * | 4/1991 | Takeuchi et al. ............. 384/450 |
| 6,086,261 A | * | 7/2000 | Nakagawa et al. .......... 384/571 |
| 6,315,458 B1 | * | 11/2001 | Unno et al. ................. 384/565 |

FOREIGN PATENT DOCUMENTS

| | | |
|---|---|---|
| JP | 5-87330 | 11/1993 |
| JP | 11-210765 | 8/1999 |

* cited by examiner

*Primary Examiner*—Thomas R. Hannon
(74) *Attorney, Agent, or Firm*—Wenderoth, Lind & Ponack, L.L.P.

(57) ABSTRACT

A tapered roller bearing comprises inner and outer and outer rings having raceways, a large flange surface and a small flange surface, tapered rollers between the raceways and each having large and small end faces at the ends, and a retainer for the tapered rollers. The average roughness of the large end faces and the large flange surface is 0.14 μm Ra or less. The radius of curvature of the large end faces is 75 to 85% of the roller reference radius, and the central angle of the contact positions between the tapered rollers and the large flange surface is $\frac{1}{15}$ to $\frac{1}{10}$ of the roller angle. The center of the contact surface between the tapered rollers and the raceways is offset toward the large end faces from the center of the rolling surfaces of the tapered rollers by 10% or less of the effective length of the tapered rollers.

10 Claims, 16 Drawing Sheets

TAPERED ROLLER BEARING

BACKGROUND OF THE INVENTION

The present invention relates to a tapered roller bearing which can be used with e.g. a driving device for a railroad wheel.

For supporting gears of a driving device for a railroad car, generally, tapered roller bearings are used which can bear relatively large radial and axial loads.

As shown in FIGS. 8 and 9, in a driving device 1 for a railroad car, power is transmitted from an output shaft 3 of a main electric motor 2 to an axle 7 supporting wheels 6 through a pinion 4 and a gear wheel 5. A gear shaft 8 carrying the pinion 4 is rotatably supported by a pair of tapered roller bearings 9. Compared with the gear wheel 5, the pinion 4 undergoes a high number of revolutions and a large load. The tapered roller bearings 9 are used in a harsh environment. Even in such an environment, superior rolling fatigue life and reliability are required.

Hereinbelow, description is made of a conventional tapered roller bearing. FIG. 14 is an enlarged sectional view of a conventional tapered roller bearing 100 which comprises an outer ring 110, an inner ring 120, tapered rollers 130 and a retainer 140. The outer ring 110 has a conical raceway 111 on the inner peripheral surface. The inner ring 120 has a conical raceway 121 on the outer peripheral surface, and a large flange surface 122 on the large-diameter side of the raceway 121 and a small flange surface 123 on the small-diameter side. The tapered rollers 130 are mounted between the raceway 111 of the outer ring 110 and the raceway 121 of the inner ring 120, and each has a conical rolling surface 131 on its outer peripheral surface and a large end face 132 and a small end face 133. The retainer 140 rollably houses a large number of the tapered rollers 130 in pockets 141 formed at regular spacings.

As shown in FIG. 15, the apexes of the raceway 111 of the outer ring 110, of the raceway 121 of the inner ring 120, and of the rolling surfaces 131 of the tapered rollers 130 converge to one point O on the central axis x of the tapered roller bearing 100. While the bearing is rotating, the tapered rollers 130 are pressed against the large flange surface 122 of the inner ring 120 by the combined force applied from the raceway 111 and the raceway 121 and undergo a rolling motion on the raceways with their large end faces 132 guided by the large flange surface 122. During rotation of the bearing, the small end faces 133 of the tapered rollers 130 do not contact the small flange surface 123 of the inner ring 120, such that there is a slight gap present therebetween.

With tapered roller bearings used in a driving device for a railroad car, especially in winter or in a cold district, low-temperature starting performance is important. That is to say, when a car, which has been stopped during a nighttime, begins to travel early in the morning, since the driving device and the bearings in the driving device are accelerated (operate) from a sufficiently cooled state, in the bearing 100, only the temperature of the inner ring 120 rapidly rises with the temperature of the outer ring 110 not following. Thus, the difference in temperature between the inner and outer rings of the bearing can be large and the initial bearing gaps disappear, so that if oil film formation at the contact portions between the large flange surface 122 of the inner ring 120 and the tapered rollers 130 is bad, the lubricating condition worsens and the bearing 100 can seize.

In particular, with a tapered roller bearing used in a driving device for a railroad car, the lubricating arrangement is such that gear oil lubricating the pinion 4 and the gear wheel 5 is splashed on the bearing making use of the rotation of the pinion 4 and the gear wheel 5. Thus, in winter or in a cold district, since the viscosity of the gear oil increases due to coldness during a nighttime, oil formation at the contact portions between the large flange surface 122 of the inner ring 120 and the large end faces 132 of the rollers 130 worsens, so that the lubricating condition tends to worsen and the bearing 100 seizes.

Also, if the contact state between the raceways 111 and 121 of the outer ring 110 and the inner ring 120 and the rolling surfaces 131 of the tapered rollers 130 is bad, skew of the tapered rollers 130 tends to grow, and the contact surface pressure at the inner ring large flange surface 122 becomes excessive, so that seizure occurs.

In order to solve these problems, in view of the fact that the oil film forming properties at the contact portions between the inner ring large flange surface and the rollers of the tapered roller bearing depend on their surface roughness, a tapered roller bearing is proposed in which the average roughness $(R)[=(Rr^2+Rb^2)^{1/2}]$ of the roughness (Rr) of the roller large end faces and the roughness (Rb) of the large flange surface of the inner ring is set at 0.14 $\mu$m Ra or less (JP patent publication 11-210765).

Also, in view of the fact that the surface pressure at the contact portions between the large flange surface of the inner ring and the tapered rollers depends on the positions of the contact portions therebetween, a tapered roller bearing is also proposed in which the radius of curvature R of the roller large end faces is set at 75–85% of the roller reference radius R0, and the central angle of the contact positions between the tapered rollers and the inner ring large flange surface will be $\frac{1}{15}$ to $\frac{1}{10}$ of the roller angle (JP utility model publication 5-87330).

But even if both of these solutions are used, it is impossible to completely prevent seizure of the bearing. Thus, confusion occurred in controlling the diagram of the railroad cars. Therefore, tapered roller bearings that are free of seizure in the bearings are strongly desired.

Thus, a first object of the present invention is to provide a tapered roller bearing which does not seize even in a severe winter or in an extremely cold region.

Another conventional tapered roller bearing used in power transmitting devices for vehicles such as ring gear support portions of differentials or shaft support portions of transmissions is shown in FIG. 16A. It includes an outer ring 222 having a conical raceway 221, an inner ring 226 having a conical raceway 223 and provided with a large flange surface 224 on the large-diameter side of the raceway 223 and a small flange surface 225 on the small-diameter side, a plurality of tapered rollers 227 rollably arranged between the raceways 221 and 223 of the outer ring 222 and inner ring 226, and a retainer 228 for retaining the tapered rollers 227 at predetermined equal circumferential distances. The distance between the large flange surface 224 and the small flange surface 225 on the inner ring 226 is designed slightly longer than the length of the tapered rollers 227.

The tapered rollers 227 are designed such that they are in line contact with the raceways 221 and 223 of the outer ring 222 and the inner ring 226, and the cone angle apexes of the tapered rollers 227 and the raceways 221 and 223 coincide on a point O on the central axis of the tapered roller bearing. With this arrangement, the tapered rollers 227 can undergo a rolling motion along the respective raceways 221 and 223.

With this tapered roller bearing, since the cone angles of the raceways 221 and 223 are different, the combined force of the loads applied from the respective raceways 221, 223 to the tapered rollers 227 acts in such a direction as to push the tapered rollers 227 toward the large flange surface 224 of the inner ring 226. Thus, during use of the bearing, the tapered rollers 227 are guided with their large end faces 229 pressed against the large flange surface 224, so that the large end faces 229 and the large flange surface 224 make sliding contact with each other.

On the other hand, since the distance between the large flange surface 224 and the small flange surface 225 of the inner ring 226 is designed slightly longer than the length of the tapered rollers 227, as shown enlarged in FIG. 16B, the small flange surface 225 does not contact the small end faces 230 of the tapered rollers 227 such that small gaps are present therebetween. Also, the small flange surface 225 is formed as a surface inclined outwardly at an angle relative to the small end faces 230.

With this tapered roller bearing, it was usual that the radius of curvature R of the large end faces 229 of the tapered rollers 227 were set at 90–97% of the reference distance Rb (that is, the distance from the apex of the cone angle of the tapered rollers 227 to the large flange surface 224 of the inner ring 226). Also, heretofore, the surface roughness of the large flange surface of the inner ring was set at 0.1–0.3 μm.

With such a tapered roller bearing, axial pre-load is loaded to prevent axial movement of the tapered rollers 227 during use and stably cause the tapered rollers 227 to make line contact with the raceways 221 and 223 of the outer ring 222 and the inner ring 226.

But with use, the flange is gnawed by metallic contact between the large end faces 229 of the tapered rollers 227 and the large flange surface 224, and contact between the edge portions of the large end faces 229 and the large flange surface 224 during skewing of the tapered rollers 227. This results in release of pre-load, a phenomenon in which the pre-load decreases gradually.

As for the relation between the preload and the bearing life, as shown in FIG. 17, while there exists a pre-load of a suitable magnitude (region in which the axial clearance is negative), the life ratio L/L0 (wherein L is a life considering the clearance and pre-load, and L0 is the life when the clearance is 0) is 1 or over. But when the axial clearance changes from zero to the positive region, release of pre-load occurs, so that the life ratio gradually decreases.

A second object of this invention is to provide a tapered roller bearing which has a longer life by preventing release of pre-load.

SUMMARY OF THE INVENTION

According to the present invention, there is provided a tapered roller bearing comprising an inner ring having a raceway on its outer peripheral surface, an outer ring having a raceway on its inner peripheral surface, a large flange surface and a small flange surface, tapered rollers rollably mounted between the raceway of the inner ring and the raceway of the outer ring and having a large end face at one end thereof and a small end face at the other end thereof, and a retainer for retaining the tapered rollers at regular spacings, wherein the average roughness $R[=(Rr^2+Rb^2)^{1/2}]$ of the roughness Rr of the large end faces of the tapered rollers and the roughness Rb of the large flange surface of the inner ring is 0.14 μm Ra or less, wherein the radius of curvature R of the large end faces of the tapered rollers is 75 to 85% of the roller reference radius, and the central angle of the contact positions between the tapered rollers and the large flange surface of the inner ring is set at ¹⁄₁₅ to ¹⁄₁₀ of the roller angle, wherein the center of the contact surface between the tapered rollers and the raceways is offset toward the large end faces of the tapered rollers from the center of the rolling surfaces of the tapered rollers by an amount which is 10% or less of the effective length of the tapered rollers.

With the tapered roller bearing described above, because the average roughness $R[=(Rr^2+Rb^2)^{1/2}]$ of the roughness Rr of the large end faces of the rollers and the roughness Rb of the large flange surface of the inner ring is set at 0.14 μm Ra or less, oil formation at the contact portions between the roller large end faces and the inner ring large flange surface is ensured. Also, because the radius of curvature R of the roller large end faces is 75 to 85% of the roller reference radius R0, and the central angle of the contact positions between the tapered rollers and the large flange of the inner ring is set at ¹⁄₁₅ to ¹⁄₁₀ of the roller angle, the sliding speed of the rollers relative to the sliding portions between the roller large end faces and the inner ring large flange surface decreases, so that the turning torque and the bearing heat buildup decrease. Further, because the center of the contact surface between the tapered rollers and the raceways is offset toward the roller large end faces from the center of the rolling surfaces of the tapered rollers by an amount which is 10% of their effective length, skew of the tapered rollers is suppressed. Also, due to their combined effects, seizure of the bearing is prevented.

According to the present invention, the rolling surfaces of the tapered rollers are crowned and the shape of the crowning at the large end face side is different from that at the small end face side of the tapered rollers.

By providing crowning on the rolling surfaces of the tapered rollers, it is possible to offset the center of the contact surface between the tapered rollers and the raceways toward the roller large end faces from the center of the rolling surfaces of the tapered rollers within a range of 10% of their effective length.

According to the present invention, the raceways are crowned so that the shape of crowning at the large flange side of the inner ring is different from the shape of crowning at the small flange side of the inner ring.

With this arrangement, it is possible to offset the center of the contact surface between the tapered rollers and the raceways toward the roller large end faces from the center of the rolling surfaces of the tapered rollers within a range of 10% of their effective length.

According to the present invention, with the contact surface between the tapered rollers and the raceways at the center of the raceways of the tapered rollers, the angle of the raceway of the outer ring is set smaller and the angle of the raceway of the inner ring raceway is set larger.

With this arrangement, too, it is possible to offset the center of the contact surface between the tapered rollers and the raceways toward the roller large end faces from the center of the rolling surfaces of the tapered rollers within a range of 10% of their effective length.

By any of the above arrangements, it is possible to offset the center of the contact surface between the tapered rollers and the raceways toward the roller large end faces from the center of the rolling surfaces of the tapered rollers within a range of 10% of their effective length, and thus it is possible to provide a tapered roller bearing in which skew of the tapered rollers is suppressed and seizure of the bearing will not occur even in a very cold season or in a cold region.

According to this invention, there is also provided a tapered roller bearing which comprises an outer ring having a conical raceway, an inner ring having a conical raceway and formed with a large flange surface on the large-diameter side of the conical raceway and a small flange surface on its small-diameter side, a plurality of tapered rollers rollably arranged between the conical raceway of the outer ring and the conical raceway of the inner ring and having a large end face and a small end face, and a retainer for retaining the tapered rollers at circumferential spacings, wherein during use of the bearing, the large end faces of the tapered rollers are guided in contact with the large flange surface of the inner ring, wherein a predetermined pre-load is imparted between the tapered rollers and the respective raceways of the outer ring and the inner ring, wherein the radius of curvature R of the large end faces of the tapered rollers is set at 75 to 85% of the reference distance Rb between the apex of cone angle of the tapered rollers and the large flange surface.

Other features and objects of the present invention will become apparent from the following description made with reference to the accompanying drawings, in which:

DETAILED DESCRIPTION OF THE PREFERRED EMBODIMENTS

Figure 2:
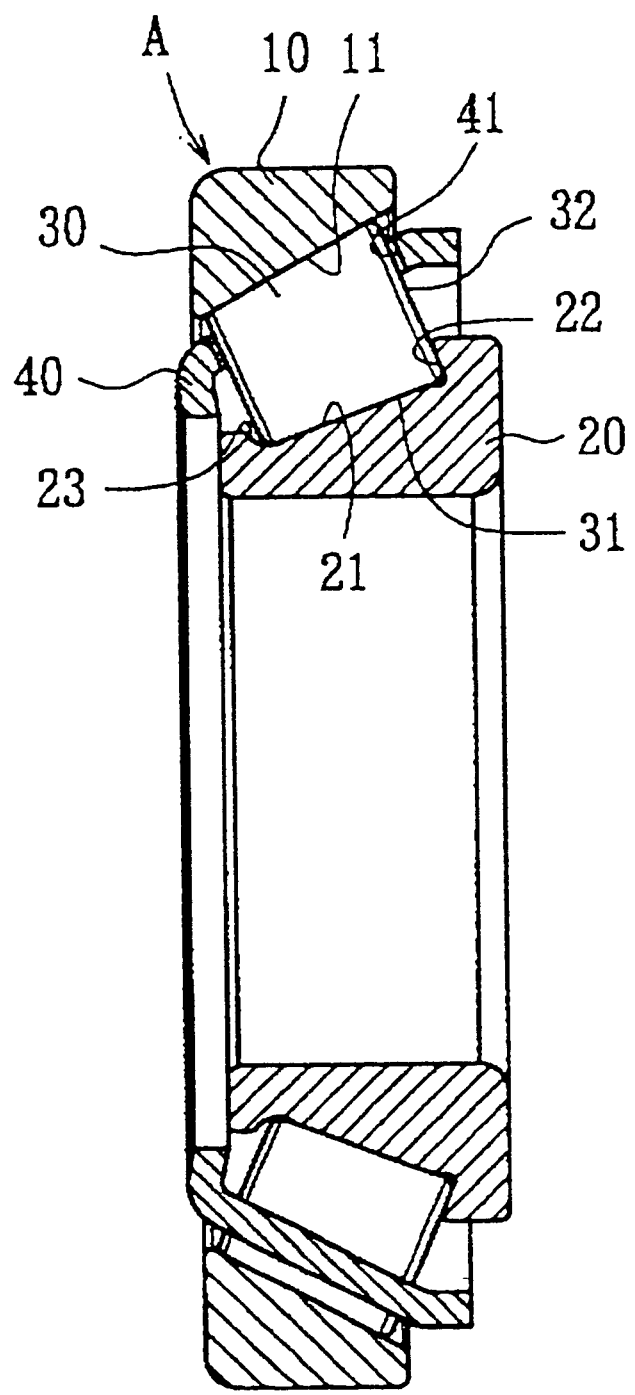
FIG. 2 is a sectional view of the tapered roller bearing of the present invention.

FIG. 2 shows an enlarged sectional view of a tapered roller bearing A of the present invention which comprises an outer ring 10, an inner ring 20, tapered rollers 30 and a retainer 40. The outer ring 10 has a conical raceway 11 on its inner peripheral surface. The inner ring 20 has a conical raceway 21 on its outer peripheral surface. It also has a large flange surface 22 on the large-diameter side of the raceway 21 and a small flange surface 23 on its small-diameter side.

The tapered rollers 30 are mounted between the outer ring 10 and the inner ring 20, and each of them has a conical rolling surface 31 on the outer peripheral surface thereof, and a large end face 32 and a small end face 33. The retainer 40 rollably houses the tapered rollers 30 in its pockets 41 at regular spacings.

Figure 3:
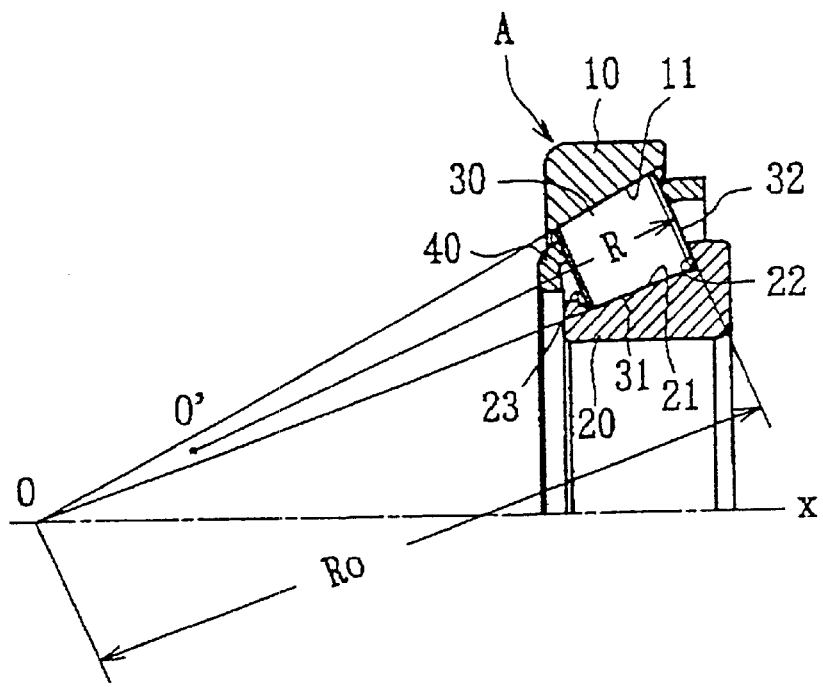
FIG. 3 is an explanatory view showing the raceways of bearing rings, rolling surfaces of tapered rollers, and the radius of curvature of large end faces of the tapered rollers of the same.

FIG. 3 explains the relation between the shapes and dimensions of the outer ring 10, inner ring 20 and tapered rollers 30. The raceway 11 of the outer ring 10, the raceway 21 of the inner ring 20 and the rolling surface 31 of each tapered roller 30 are formed into conical surfaces which converge at one point O on the central axis x of the bearing.

The large end faces 32 of the tapered rollers 30 are formed to be spherical, having a radius of curvature R and the center of curvature on point O' nearer to the tapered rollers 30 than is point O. The average roughness $R[=(Rr^2+Rb^2)^{1/2}]$ of the roughness Rr of the large end faces of the tapered rollers 30 (hereinafter referred to as roller large end faces) and the roughness Rb of the large flange surface 22 of the inner ring 20 (hereinafter referred to as inner ring large flange surface), which contacts and guides the roller large end face, is set at 0.14 μmRa or under.

Figure 4:
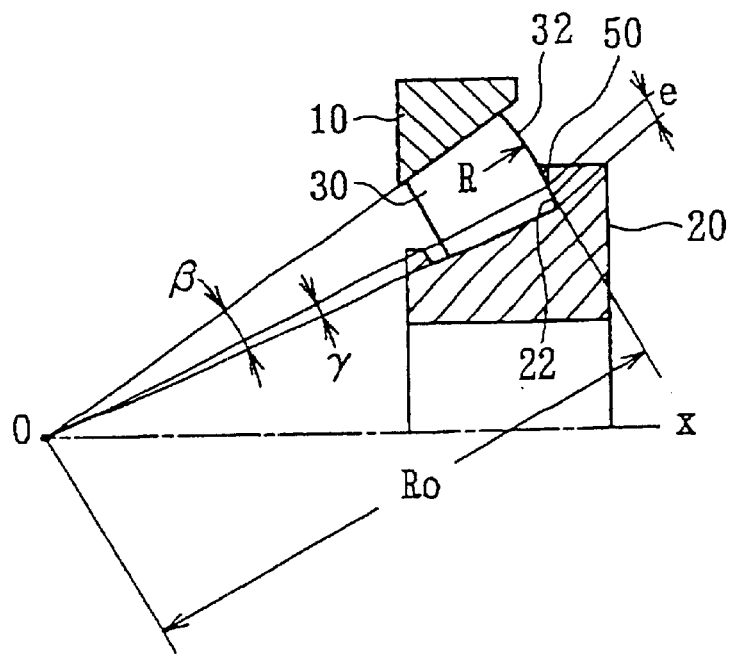
FIG. 4 is an explanatory view showing a contact surface between the tapered rollers and an inner ring large flange surface of the same.

Also, as shown in FIG. 4, the radius of curvature R of the roller large end faces 32 is set at 75 to 85% of the roller reference radius R0 and the central angle γ of the contact portion between each tapered roller 30 and the inner ring large flange surface 22 is set to be $\frac{1}{15}$ to $\frac{1}{10}$ (reduction of about 20–50%) of the roller angle β. Also, FIG. 4 shows a contact portion 50 between each tapered roller 30 and the inner ring large flange surface 22 and a contact range e of the contact portion 50.

Figure 5:
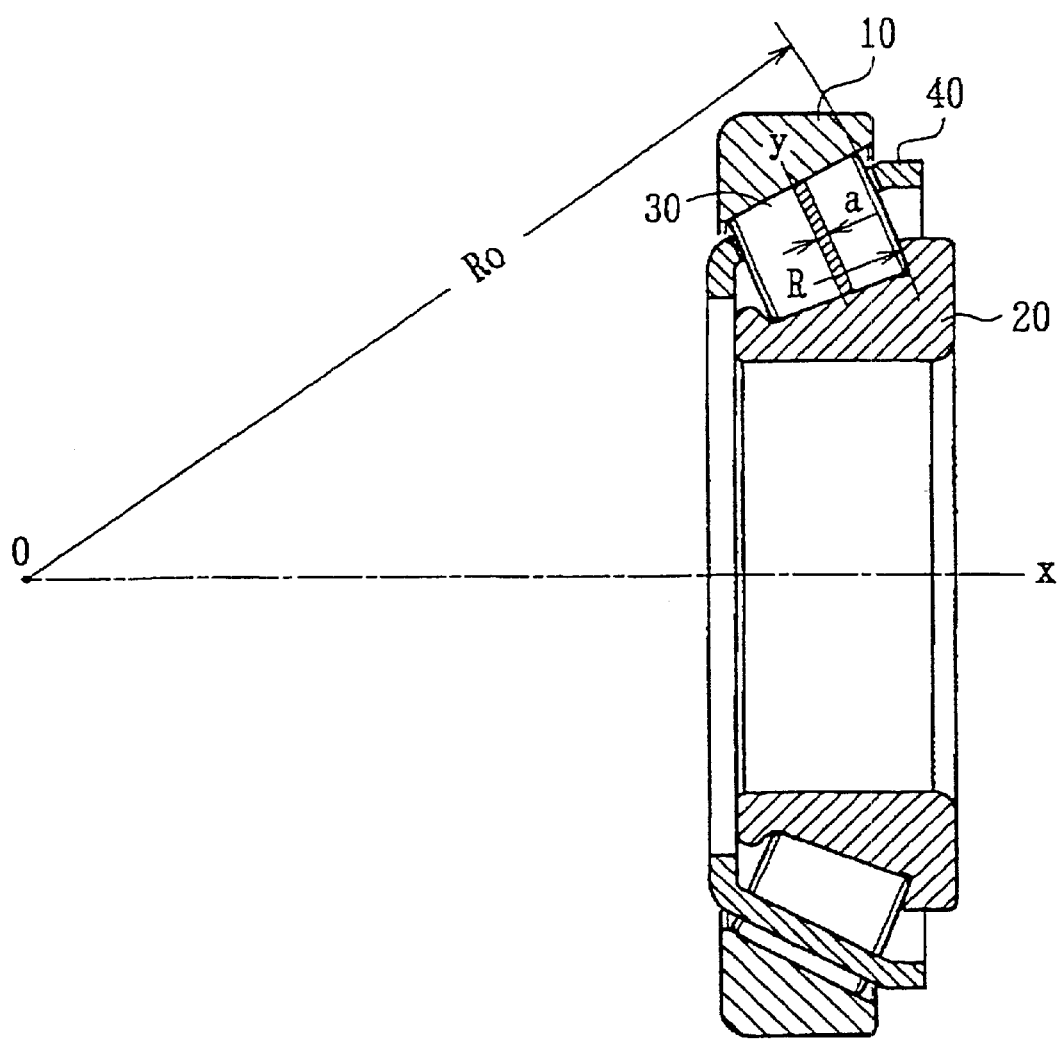
FIG. 5 is a partial enlarged sectional view for explaining the range of the center of a contact surface between the tapered rollers and raceways of the same.

Further, as shown in FIG. 5, the center of the contact surface between the rolling surface 31 of each tapered roller 30 and the raceways 11 and 12 of the bearing rings (outer ring 10 and inner ring 20) is offset toward the large end face 32 from the center y of the rolling surfaces 31 of the tapered rollers 30 within a range a which is 10% or less of the effective length of the rollers 30.

Figure 1:
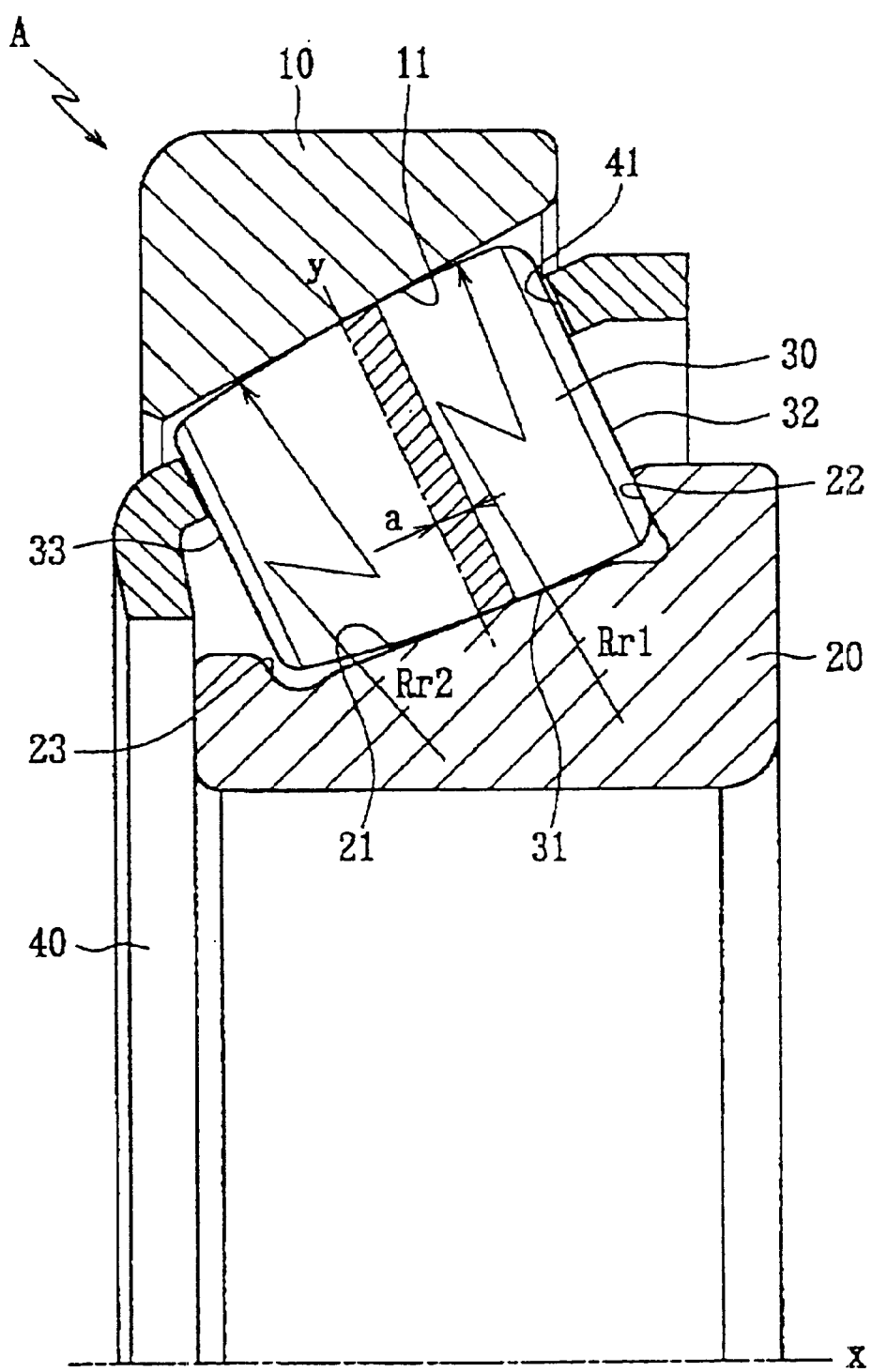
FIG. 1 is a partial enlarged sectional view of a tapered roller bearing of a first embodiment of the present invention.

FIG. 1 shows a first embodiment in which the center of the contact surface between the rolling surface 31 of each tapered roller 30 and the raceways 11 and 12 of the bearing rings (outer ring 10 and inner ring 20) is offset toward the large end face 32 from the center y of the rolling surface 31 of the tapered roller 30 within a range a of 10% or less of the effective length of the rollers, and the rolling surfaces 31 of the tapered rollers 30 are crowned. The crowning shape is such that the radius of the curvature Rr1 of the tapered rollers 30 on their large end face side differs from the radius of curvature Rr2 on the small end face side so that the relation Rr1>Rr2 is met.

According to this invention, firstly, the oil film-forming property at the contact portions between the tapered rollers 30 and the inner ring large flange surface 22 is improved due to the arrangement that the average roughness $R[=(Rr^2+Rb^2)^{1/2}]$ of the roughness Rr of the roller large end faces 32 and the roughness Rb of the inner ring large flange surface 22 is set at 0.14 μm Ra or under. Secondly, reduction in the bearing heat buildup resulting from reduction in the sliding speed at the sliding portion is achieved due to the arrangement that the radius of curvature R of the roller large end faces 32 is set at 75 to 85% of the roller reference radius R0 and that the central angle γ of the contact positions between the tapered rollers 30 and the inner ring large flange surface 22 is set to 1/15 to 1/10 of the roller angle β. Thirdly the skew of the tapered rollers 30 is suppressed due to the arrangement that the center of the contact surface between the rolling surface 31 of each tapered roller 30 and the raceways 11 and 12 of the bearing rings (outer ring 10 and inner ring 20) is offset toward the large end face 32 from the center y of the rolling surface 31 of the tapered roller 30 within a range a which is 10% or less of the effective length of the rollers. By collaboration of these three functions, seizure of the bearing is prevented.

Figure 6:
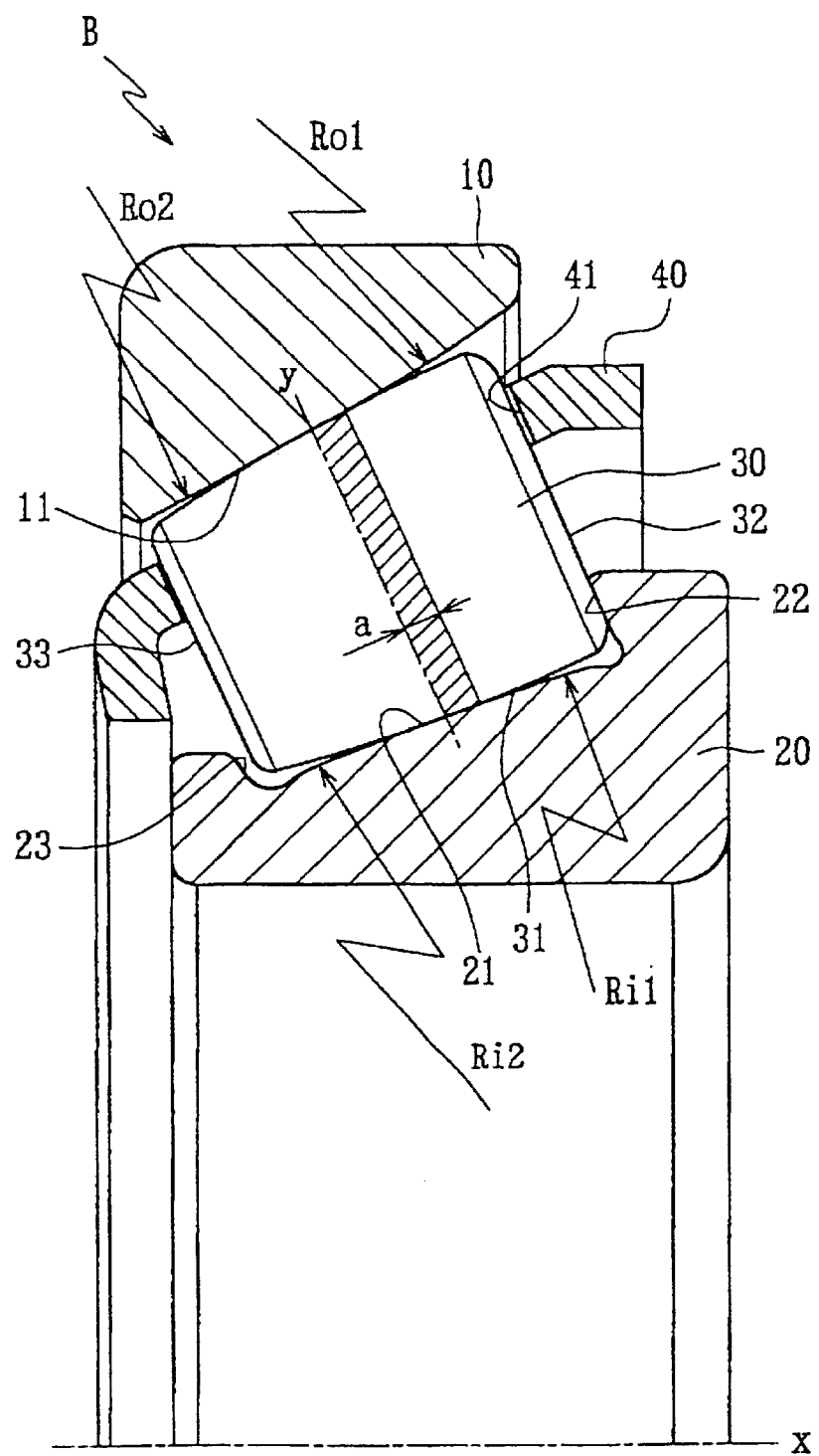
FIG. 6 is a partial enlarged sectional view of a tapered roller bearing of a second embodiment of the present invention.

FIG. 6 shows a second embodiment in which the center of the contact surface between the rolling surface 31 of each tapered roller 30 and the raceways 11 and 12 of the bearing rings (outer ring 10 and inner ring 20) is offset toward the large end face 32 from the center y of the rolling surfaces 31 of the tapered rollers 30 within a range a of 10% or less of the effective length of the rollers, and the raceways 11 and 21 of the outer ring 10 and inner ring 20 are crowned. The crowning shape is such that the radius of the curvature Ro1 of the raceway 11 of the outer ring 10 on the large-diameter side differs from the radius of curvature Ro2 on the small-diameter side so that the relation Ro1>Ro2 is met, and the radii of curvature Ri1 and Ri2 of the raceway 21 of the inner ring 20 on the large-diameter and small-diameter sides are set so as to satisfy the relation Ri1>Ri2. With this arrangement, too, skew of the tapered rollers 30 is suppressed and the seizure of the bearing is prevented, as in the embodiment of FIG. 1.

While not shown, as another embodiment, the center of the contact surface between the rolling surface 31 of each tapered roller 30 and the raceways 11 and 21 of the bearing rings (outer ring 10 and inner ring 20) is offset toward the large end face 32 from the center y of the rolling surfaces 31 of the tapered rollers 30 within a range a of 10% or less of the effective length of the rollers, and the raceway angle of the outer ring 10 may be set smaller with the raceway angle of the inner ring 20 larger with the contact position between the tapered rollers and the raceways of the bearing rings at the center y of the rolling surface 31 of each tapered roller 30. With this arrangement, too, skew of the tapered rollers 30 is suppressed and the seizure of the bearing is prevented, as in the embodiments of FIGS. 1 and 6.

While not shown, the roller angle of the tapered rollers 30 may be increased with the raceway angles of the outer ring 10 and the inner ring 20 unchanged. With this arrangement too, as in FIGS. 1 and 6, the center of the contact surface between the rolling surface 31 of each tapered roller 30 and the raceways 11 and 21 of the bearing rings (outer ring 10 and inner ring 20) can be offset toward the large end face 32 from the center y of the rolling surfaces 31 of the tapered rollers 30 within a range a of 10% or less of the effective length of the rollers. With this arrangement, too, it is possible to suppress skew of the tapered rollers 30 and prevent seizure of the bearing.

EXAMPLES

Hereinbelow, description is made of Examples of the tapered roller bearing of the present invention. Bearing specifications: 70 dia.×150 dia.×38

The center of the contact surface between the tapered rollers and the raceways is offset toward the large end faces 32 from the center y of the rolling surfaces of the tapered rollers by 5% of the effective length of the rollers.

Tester: Vertical Type Torque Tester
Test Conditions
    Immersing oil: Railroad sonic EP3080
    Load: 600 kgf
    Number of revolutions: 3000 rpm (rise time: about 4 seconds)
    Test temperature: Room temperature
    Gap: 100 μm
Testing Method
    ① The bearings to be tested are immersed in oil in the position of V.
    ② After taking out the bearings, they are left to stand for 30 minutes in the position of V.
    ③ They are mounted on a vertical type torque tester in the position of V and tested under the above test conditions.

Figure 7:
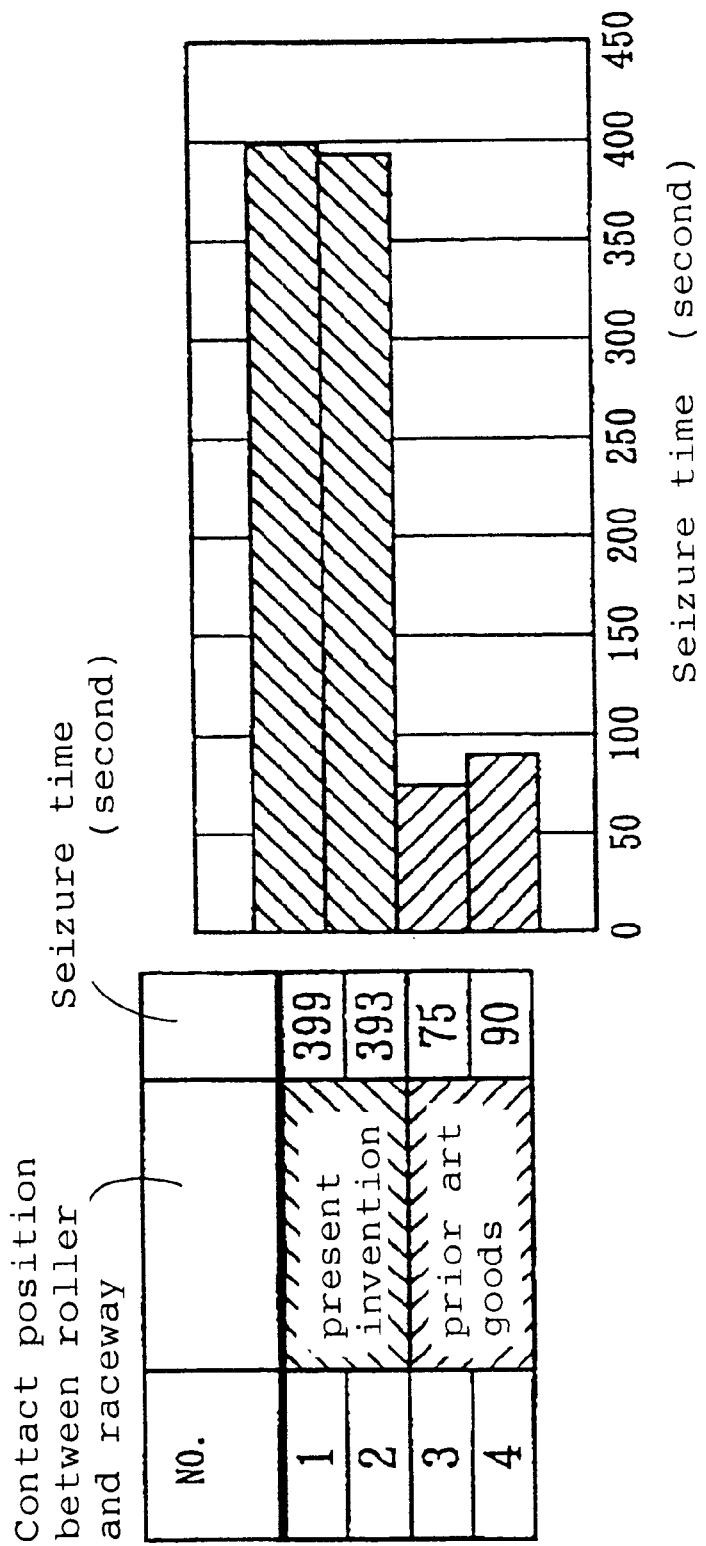
FIG. 7 is a graph showing the results of a seizure time test for articles of the present invention and conventional articles.
Figure 8:
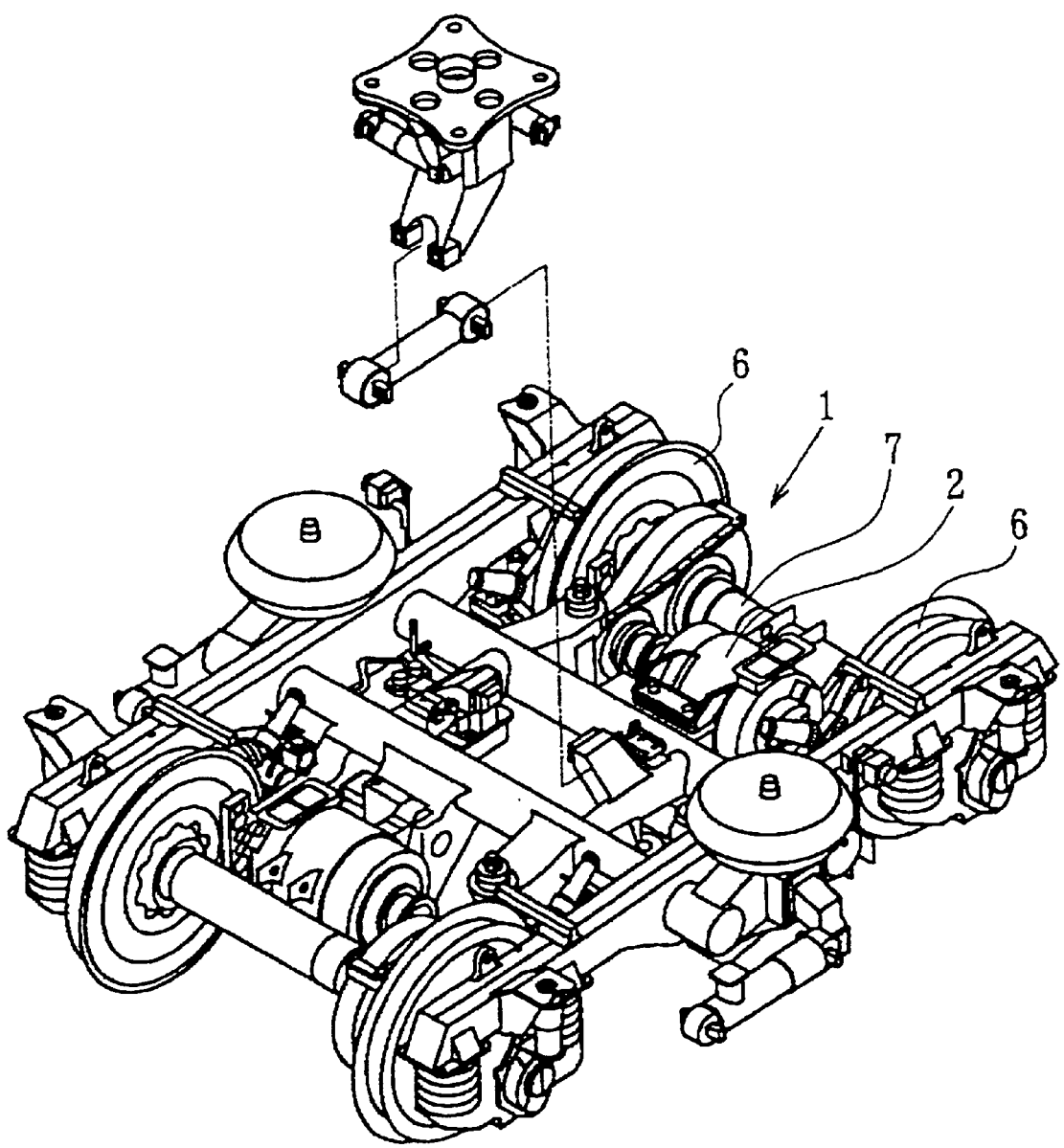
FIG. 8 is a perspective view of car driving device in which are mounted tapered roller bearings.
Figure 9:
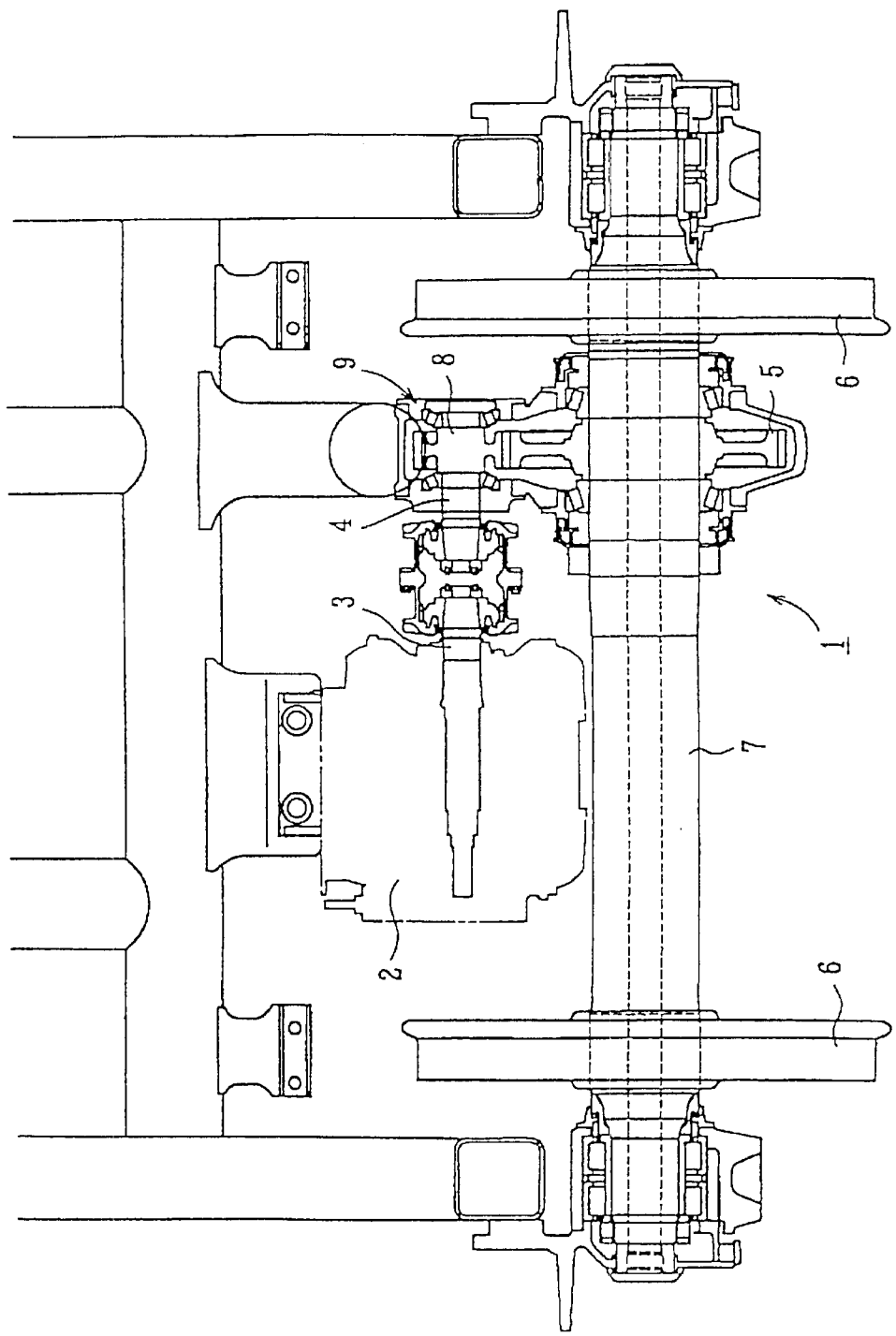
FIG. 9 is a partially sectional plan view of the car driving device.

If motor overload occurs where the current value is 7A, due to increased torque, decision of seizure is made.
Test Results FIG. 7 shows the test results in which No. 1 and No. 2 show Examples of the present invention and No. 3 and No. 4 show Comparative Examples. As is apparent from FIG. 7, with the tapered roller bearings of Examples of the present invention, the average seizure time was 396 seconds (max.-min.=6 seconds), while with Comparative Examples, the average seizure time was 82.5 seconds (max.-min.=15 seconds). Thus, the articles of the present invention are not only longer in the average seizure time, i.e. about 4.8 times that of the conventional bearings, but small in variation.

Also, for bearing specifications similar to the above, in tests in which, simulating actual seizure conditions, they were sharply accelerated from a cold state, articles of conventional specifications developed seizure, while the articles of the present invention developed no seizure.

If the center of the contact surface between the tapered rollers and the raceways is offset toward the large end face by an amount which is over 10% of the effective length of the rollers, smoothness in the rolling motion of the tapered rollers is lost and thus the effect of preventing seizure of the bearing is not obtainable. Thus, according to the present invention, the center of the contact surface between the tapered rollers and the raceways is offset toward the large end face from the center of the rolling surfaces of the tapered rollers by an amount which is 10% or less of the effective length of the rollers.

The present inventors tested not only the tapered roller bearings shown in the Examples but those of other dimensions, and results similar to the above were obtained.

Figure 10:
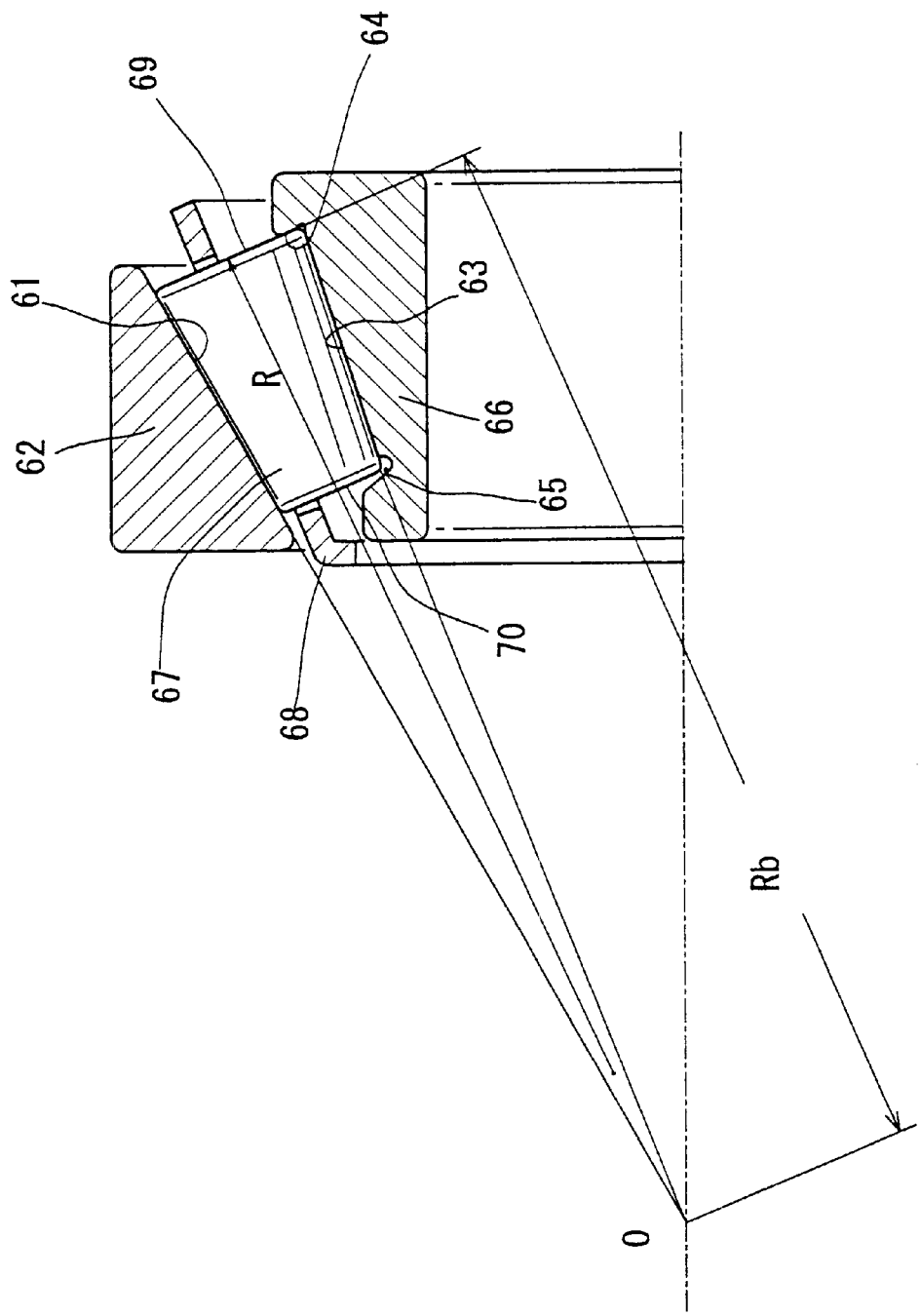
FIG. 10 is a partially omitted sectional view of a third embodiment.
Figure 11A:
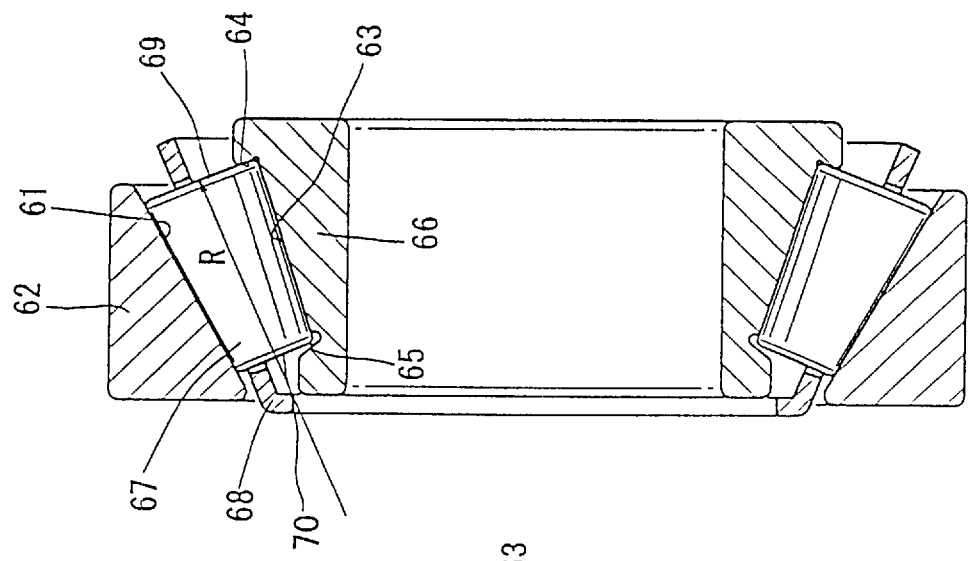
FIG. 11A is an enlarged sectional view of the same.

Hereinbelow, a third embodiment of this invention will be described with reference to FIGS. 10–13. As shown in FIGS. 10 and 11, the tapered roller bearing of this embodiment comprises, as in the prior art bearing, an outer ring 62 having a conical raceway 61, an inner ring 66 having a conical raceway 63 and formed with a large flange surface 64 on the large-diameter side of the raceway 63 and a small flange surface 65 on its small-diameter side, a plurality of tapered rollers 67 rollably arranged between the raceways 61 and 63 of the outer ring 62 and the inner ring 66, and a retainer 68 for retaining the tapered rollers 67 at equal circumferential spacings. The distance between the large flange surface 64 and the small flange surface 65 of the inner ring 66 is set to be slightly longer than the length of the tapered rollers 67.

The tapered rollers 67 are arranged such that they are in line contact with the raceways 61 and 63 of the outer ring 62 and the inner ring 66, and the cone angle apexes of the tapered rollers 67 and the raceways 61 and 63 converge on a point O on the central axis of the tapered roller bearing.

With this arrangement, the tapered rollers 67 can undergo a rolling motion along the raceways 61 and 63.

With this tapered roller bearing, since the raceways 61 and 63 have different cone angles, combined force of the loads applied from the respective raceways 61, 63 to the tapered rollers 67 acts in such a direction as to push the tapered rollers 67 against the large flange surface 64 of the inner ring 66. Thus, during use of the bearing, the tapered rollers 67 are guided with their large end faces 69 pressed against the large flange surface 64, so that the large end faces 69 and the large flange surface 64 make sliding contact with each other.

Figure 11B:
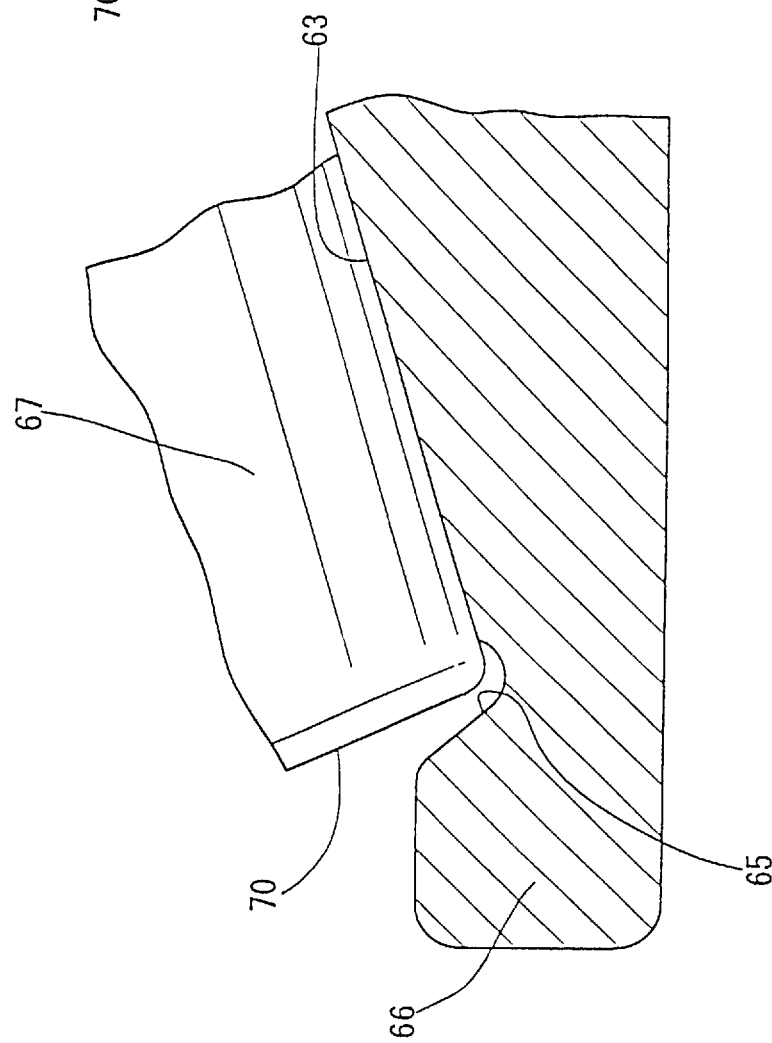
FIG. 11B is a partial enlarged sectional view of the same.
Figure 12:
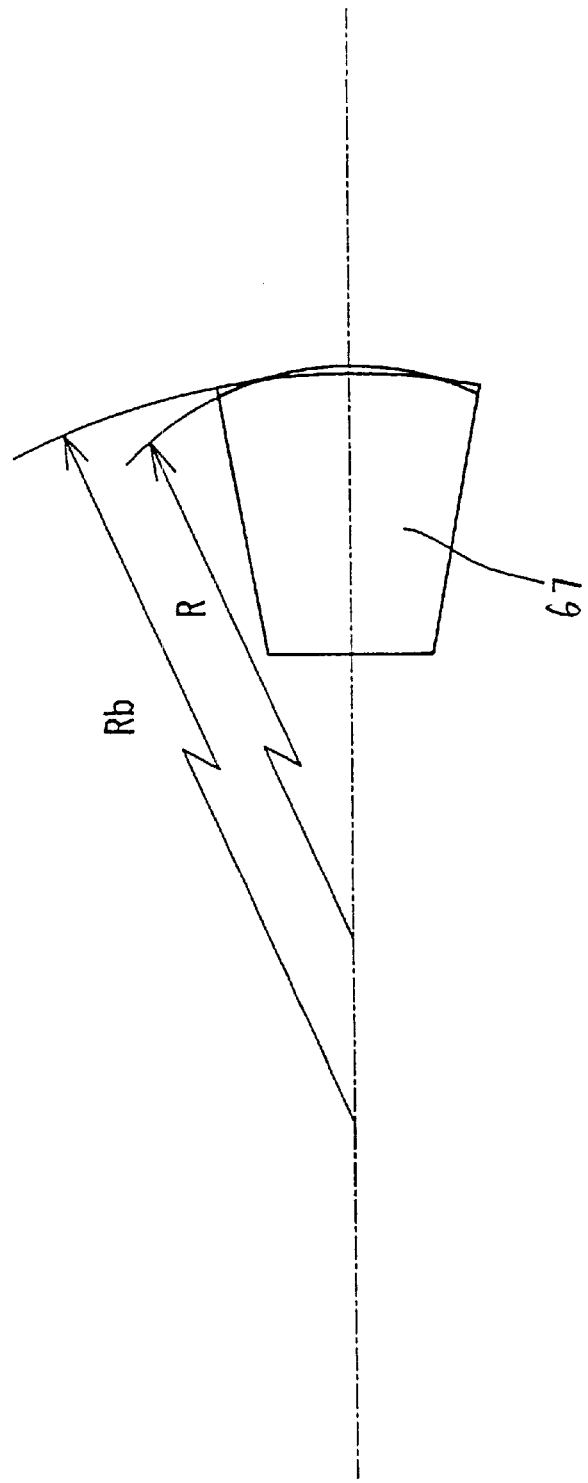
FIG. 12 is a plan view of the same.

On the other hand, since the distance between the large flange surface 64 and the small flange surface 65 of the inner ring 66 is designed to be slightly longer than the length of the tapered rollers 67, as shown enlarged in FIG. 11B, the small flange surface 65 does not contact the small end faces 70 of the tapered rollers 67 such that a small gap is present therebetween. Also, the small flange surface 65 is formed so as to be inclined outwardly relative to the small end faces 70.

With this tapered roller bearing, the radius of curvature R (FIG. 12) of the large end faces 69 of the tapered rollers 67 is set at 75–85% or under of the reference distance Rb (that is, distance from the apex of the cone angle of the tapered rollers 67 to the large flange surface 64 of inner ring). Also, the surface roughness of the large flange surface 64 of the inner ring 66 is set to 0.01 to 0.08 $\mu$m and the surface roughness of the large end faces 69 of the tapered rollers 67 is set to 0.01 to 0.08 $\mu$m.

The lower limit values (0.01 $\mu$m) of these surface roughnesses are the machinability limit, and the upper limit values (0.08 $\mu$m) are those which are effective for release of pre-load.

EXPERIMENT EXAMPLES

Figure 13:
FIG. 13 is a graph showing experiment results.
Figure 14:
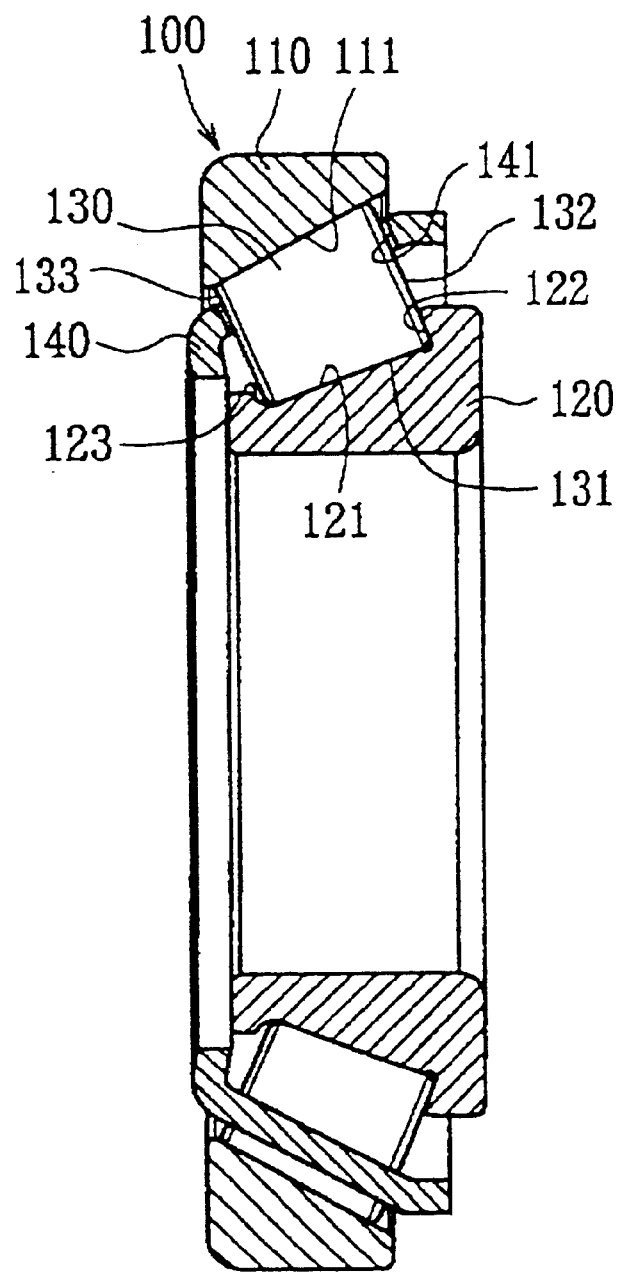
FIG. 14 is a sectional view of a conventional tapered roller bearing.
Figure 15:
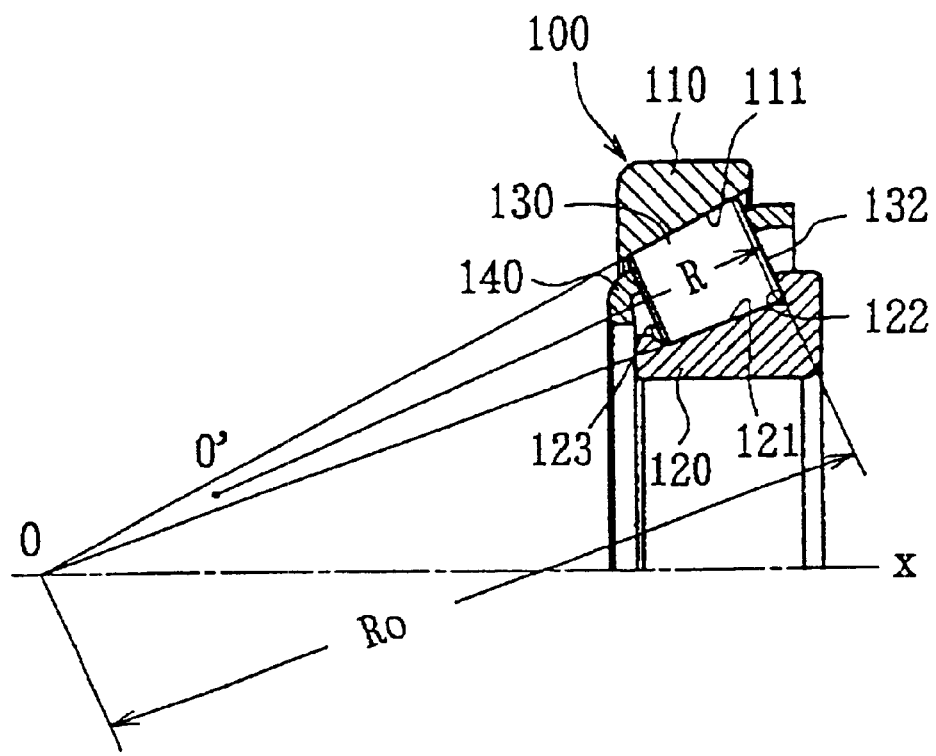
FIG. 15 is a partial sectional view explaining the shapes of raceways of inner and outer rings and rolling surfaces of tapered rollers in a conventional tapered roller bearing.
Figure 16A:
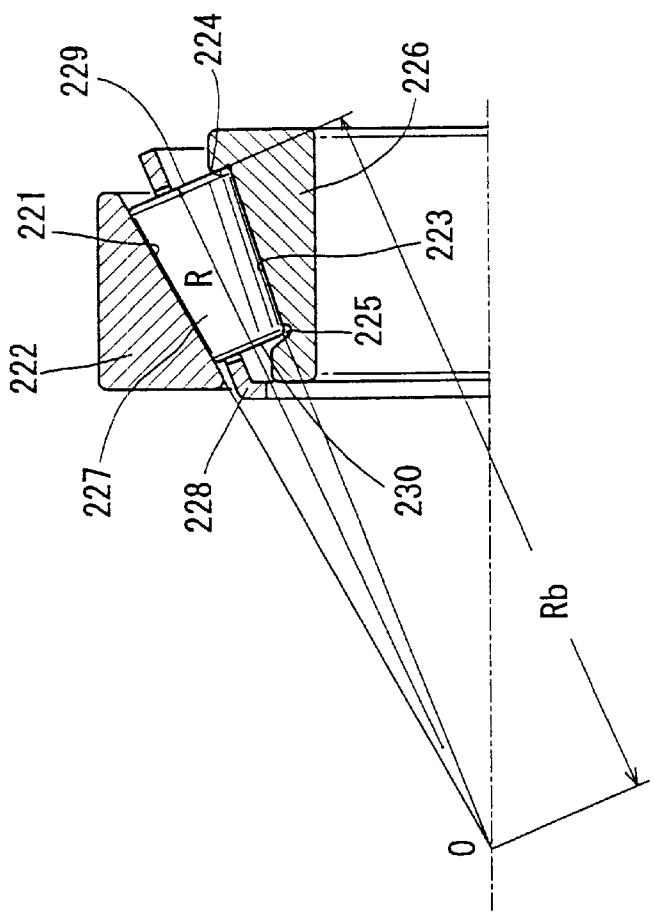
FIG. 16A is a partial sectional view of a conventional bearing.
Figure 16B:
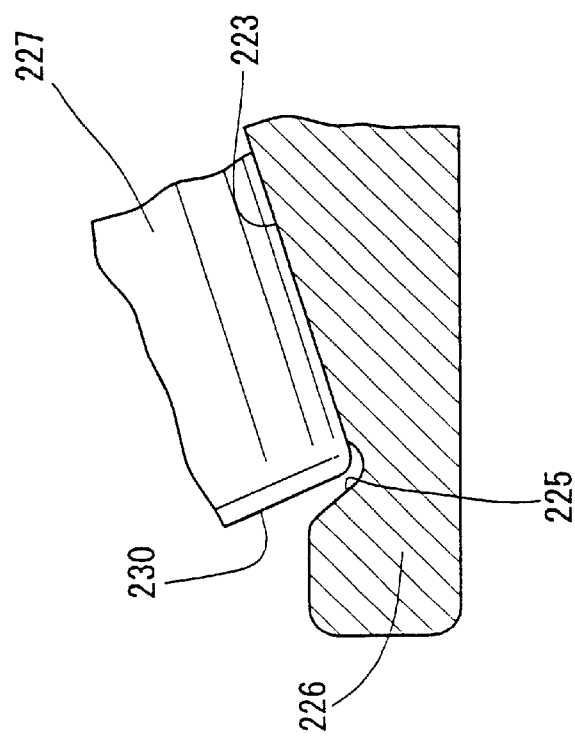
FIG. 16B is a partial enlarged view of the same.
Figure 17:
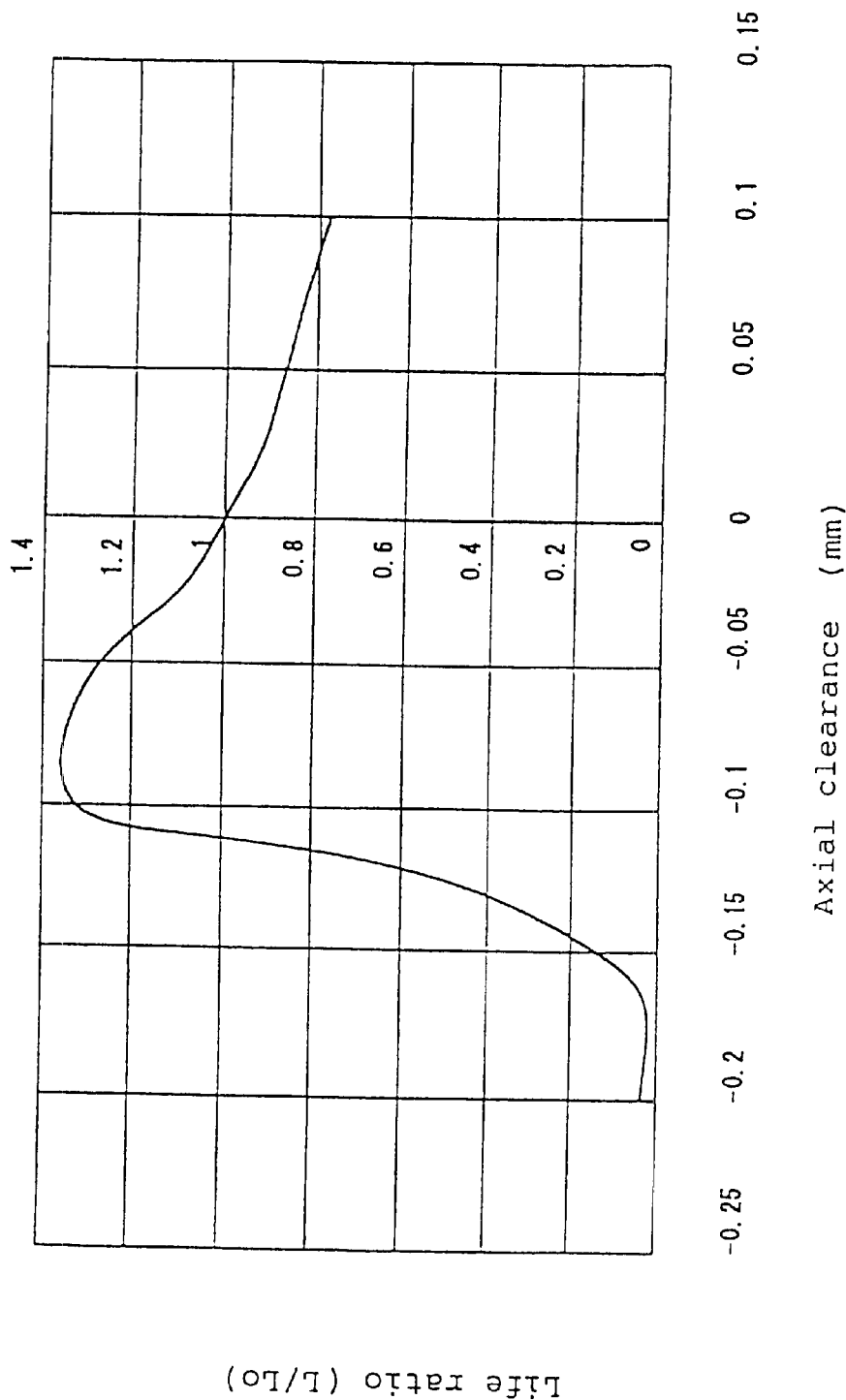
FIG. 17 is a graph showing a relation between preload and bearing life.

With the tapered roller bearing of the first embodiment, the results of an experiment conducted for the relation between the radius of curvature R of the large end faces 69 of the tapered rollers 67 and the amount of release of pre-load are shown in FIG. 13. As for the experimental conditions, two of each test piece (No. 1 and No. 2) were prepared and the ratio R/Rb in percentage was changed from 70% to 95% at 5% intervals and they were operated for 100 hours with the initial pre-load set at 4.9 kN to measure the release of pre-load.

The surface roughnesses of the large flange surfaces 69 of the test pieces No. 1 and No. 2 were 0.8 $\mu$m and the surface roughnesses of the large end faces 69 were 0.8 $\mu$m.

As shown in FIG. 13, the release of pre-load was the smallest when R/Rb was 75%, and the range of 75–85% is considered to be desirable. It is considered that desirable results have been shown within this range because, by setting the radius of curvature R of the large end faces 69 of the tapered rollers 67 smaller than is conventional, oil film formation between the large end faces 69 and the large flange surface 64 becomes easy, so that the wear due to metallic contact hardly occurs and the flange gnawing during skewing of the tapered rollers also becomes less likely to occur.

With the tapered roller bearing according to this invention, since the radius of curvature R of the large end faces of the tapered rollers is set at 75–85% of the reference distance Rb, release of pre-load decreases. Thus it is possible to suppress decrease in the bearing life and the life of a mission gear using it.

What is claimed is:

1. A tapered roller bearing comprising an inner ring having a raceway on its outer peripheral surface, an outer ring having a raceway on its inner peripheral surface, a large flange surface and a small flange surface, tapered rollers rollably mounted between the raceway of said inner ring and the raceway of said outer ring and having a large end face at one end thereof and a small end face at the other end thereof, and a retainer for retaining said tapered rollers at regular spacings, wherein the average roughness $R[=(Rr^2+Rb^2)^{1/2}]$ of the roughness Rr of the large end faces of said tapered rollers and the roughness Rb of the large flange surface of said inner ring is 0.14 $\mu$m Ra or less, wherein the radius of curvature R of the large end faces of said tapered rollers is 75 to 85% of the roller reference radius, and the central angle of the contact positions between said tapered rollers and the large flange surface of said inner ring is set at 1/15 to 1/10 of the roller angle, wherein the center of the contact surface between said tapered rollers and said raceways is offset toward the large end faces of said tapered rollers from the center of the rolling surfaces of said tapered rollers by an amount which is 10% or less of the effective length of said tapered rollers.

2. A tapered roller bearing as claimed in claim 1 wherein the rolling surfaces of said tapered rollers are crowned and the shape of crowning at the large end face side of said tapered rollers is different from the shape of crowning at the small end face side of said tapered rollers.

3. A tapered roller bearing as claimed in claim 2 wherein with the contact position between said tapered rollers and said raceways at the center of the raceways of said tapered rollers, the angle of the raceway of said outer ring is set smaller and the angle of the raceway of said inner ring raceway is set larger.

4. A tapered roller bearing as claimed in claim 1 wherein said raceways are crowned so that the shape of crowning at the large flange side of said inner ring is different from the shape of crowning at the small flange side of said inner ring.

5. A tapered roller bearing as claimed in claim 4 wherein with the contact position between said tapered rollers and said raceways at the center of the raceways of said tapered rollers, the angle of the raceway of said outer ring is set smaller and the angle of the race way of said inner ring raceway is set larger.

6. A tapered roller bearing as claimed in claim 1 wherein with the contact position between said tapered rollers and said raceways at the center of the raceways of said tapered rollers, the angle of the raceway of said outer ring is set smaller and the angle of the raceway of said inner ring raceway is set larger.

7. A tapered roller bearing comprising an outer ring having a conical raceway, an inner ring having a conical raceway and formed with a large flange surface on the large-diameter side of said conical raceway and a small flange surface on its small-diameter side, a plurality of tapered rollers rollably arranged between said conical raceway of said outer ring and said conical raceway of said inner ring and having a large end face and a small end face, and a retainer for retaining said tapered rollers at circumferential spacings, wherein during use of the bearing, the large end faces of said tapered rollers are guided in contact with the large flange surface of said inner ring, wherein a predetermined pre-load is imparted between said tapered rollers and said respective raceways of said outer ring and said inner ring, wherein the radius of curvature R of the large end faces of said tapered rollers is set at 75 to 85% of the reference distance Rb between the apex of cone angle of said tapered rollers and said large flange surface.

8. A tapered roller bearing as claimed in claim 7 wherein the radius of curvature R of the large end faces of said tapered rollers is set to prevent release of pre-load.

9. A tapered roller bearing as claimed in claim 8 wherein the surface roughness of said large flange surface of said inner ring is set to 0.01 to 0.08 μm, and the surface roughness of the large end faces of said tapered rollers is set to 0.01 to 0.08 μm.

10. A tapered roller bearing as claimed in claim 7 wherein the surface roughness of said large flange surface of said inner ring is set to 0.01 to 0.08 μm, and the surface roughness of the large end faces of said tapered rollers is set to 0.01 to 0.08 μm.

* * * * *